(12) United States Patent
Wojnicz et al.

(10) Patent No.: US 11,240,710 B2
(45) Date of Patent: Feb. 1, 2022

(54) DEVICE AND METHOD FOR CONTROLLING LOAD ON A SERVER

(71) Applicant: MOTOROLA SOLUTIONS, INC., Chicago, IL (US)

(72) Inventors: Marcin Wojnicz, Tarnow (PL); Pawel Jurzak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 97 days.

(21) Appl. No.: 16/637,405

(22) PCT Filed: Aug. 29, 2017

(86) PCT No.: PCT/PL2017/050041
§ 371 (c)(1),
(2) Date: Feb. 7, 2020

(87) PCT Pub. No.: WO2019/045578
PCT Pub. Date: Mar. 7, 2019

(65) Prior Publication Data
US 2020/0196193 A1 Jun. 18, 2020

(51) Int. Cl.
*G01R 31/08* (2020.01)
*G06F 11/00* (2006.01)
(Continued)

(52) U.S. Cl.
CPC .......... *H04W 28/08* (2013.01); *H04L 47/125* (2013.01); *H04W 4/029* (2018.02)

(58) Field of Classification Search
CPC ..... H04W 28/08; H04W 4/029; H04W 84/12; H04W 8/26; H04W 36/0072; H04W 60/00; H04W 36/0005; H04W 36/0055; H04W 36/30; H04W 74/006; H04L 47/125; H04L 49/70; H04L 61/2015; H04L 61/2084;
(Continued)

(56) References Cited

U.S. PATENT DOCUMENTS 5,345,071 A * 9/1994 Dumont ............. G06K 7/10881
235/383
5,468,942 A 11/1995 Oosterveen et al.
(Continued)

OTHER PUBLICATIONS

International Search Report & Written Opinion dated Apr. 25, 2018 in the corresponding PCT Application No. PCT/PL2017/050041, Filed Aug. 29, 2017, entitled "Device and Method for Controlling Load on a Server".
(Continued)

*Primary Examiner* — Stephen M D Agosta
(74) *Attorney, Agent, or Firm* — Perry + Currier, Inc.

(57) ABSTRACT

A device and method for controlling load on a server is provided. A server comprises: memory storing information associated with user identifiers; a communication interface; and a controller. The controller is configured to: receive, using the communication interface, a user identifier; assign an available mobile device, of a plurality of shared mobile devices, to the user identifier, the available mobile device storing respective information associated with the user identifier; and control, via the communication interface, an output device to provide an indication of an assignment of the available mobile device.

16 Claims, 14 Drawing Sheets

(51) Int. Cl.
*G08C 15/00* (2006.01)
*H04J 3/14* (2006.01)
*H04L 1/00* (2006.01)
*H04L 12/26* (2006.01)
*H04W 28/08* (2009.01)
*H04W 4/029* (2018.01)
*H04L 12/803* (2013.01)

(58) Field of Classification Search
CPC .... H04L 2012/5607; H04L 2012/5608; H04M 15/00; H04M 11/007; H04M 15/41; H04M 15/60; H04M 15/705; H04M 15/80; H04J 3/1682
See application file for complete search history.

(56) References Cited

U.S. PATENT DOCUMENTS

| | | | | |
|---|---|---|---|---|
| 5,637,846 | A * | 6/1997 | Boers | A47F 9/047 235/382 |
| 6,363,355 | B1 * | 3/2002 | Morrison | A47F 9/047 186/59 |
| 7,063,263 | B2 * | 6/2006 | Swartz | G06Q 30/02 235/472.02 |
| 7,620,475 | B1 * | 11/2009 | Bottazzi | G06Q 20/343 235/383 |
| 7,762,458 | B2 * | 7/2010 | Stawar | G06Q 20/20 235/383 |
| 8,204,473 | B2 | 6/2012 | Mathis et al. | |
| 2002/0072390 | A1 * | 6/2002 | Uchiyama | H04M 1/04 455/557 |
| 2005/0051620 | A1 * | 3/2005 | DiLuoffo | G07F 7/08 235/382 |
| 2008/0300693 | A1 * | 12/2008 | Sesay | H04L 67/34 700/12 |
| 2009/0172160 | A1 | 7/2009 | Klein | |
| 2011/0086611 | A1 | 4/2011 | Klein et al. | |
| 2011/0306882 | A1 * | 12/2011 | Hannon | A61B 6/4494 600/443 |
| 2012/0078671 | A1 | 3/2012 | Mohebbi et al. | |
| 2014/0173588 | A1 | 6/2014 | Ko | |
| 2020/0164886 | A1 * | 5/2020 | Dutta | G06F 21/6236 |

OTHER PUBLICATIONS

Multi-User for Shared iOS Drvices, MobileIron, published Mar. 14, 2013.

* cited by examiner

DEVICE AND METHOD FOR CONTROLLING LOAD ON A SERVER

BACKGROUND OF THE INVENTION

Provisioning resources to large numbers of shared mobile devices is challenging. Such shared mobile devices are often stored in common areas and, at shift changes, a mobile device is retrieved and used to log into a system via user credentials and the like. Backend servers provision the mobile device based on the user credentials, for example by searching for data associated with the user credentials, and transmitting the data to the mobile device (e.g. contacts, groups, roles, messages, applications, application data, etc.). In addition, in very large organizations, such provisioning may occur for tens of thousands of mobile devices over short time periods, such as during shift changes. For example, 50,000 mobile devices may be provisioned during a shift change; assuming each mobile device receives 20 MB of data, the backend servers are transmitting 1 TB of data during the shift change. Hence, such provisioning can place an enormous load on backend servers The problem may be particularly acute when the mobile devices are public safety devices (e.g. provisioned in public safety organizations, such as policing organizations and the like), where shift changes are to occur quickly due, for example, to emergency situations where the mobile devices and/or the public safety officers, and the like, must be quickly dispatched. This can lead to additional servers being purchased and deployed to handle such large loads of data over short periods of time, and which may otherwise be idle. Furthermore, the mobile devices being provisioned may not be ready for use for several minutes after log-in until all the data is received, which can be problematic both with regards to human resource management (e.g. employees logged into the mobile devices may be idle during the download of the data), and in emergencies.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
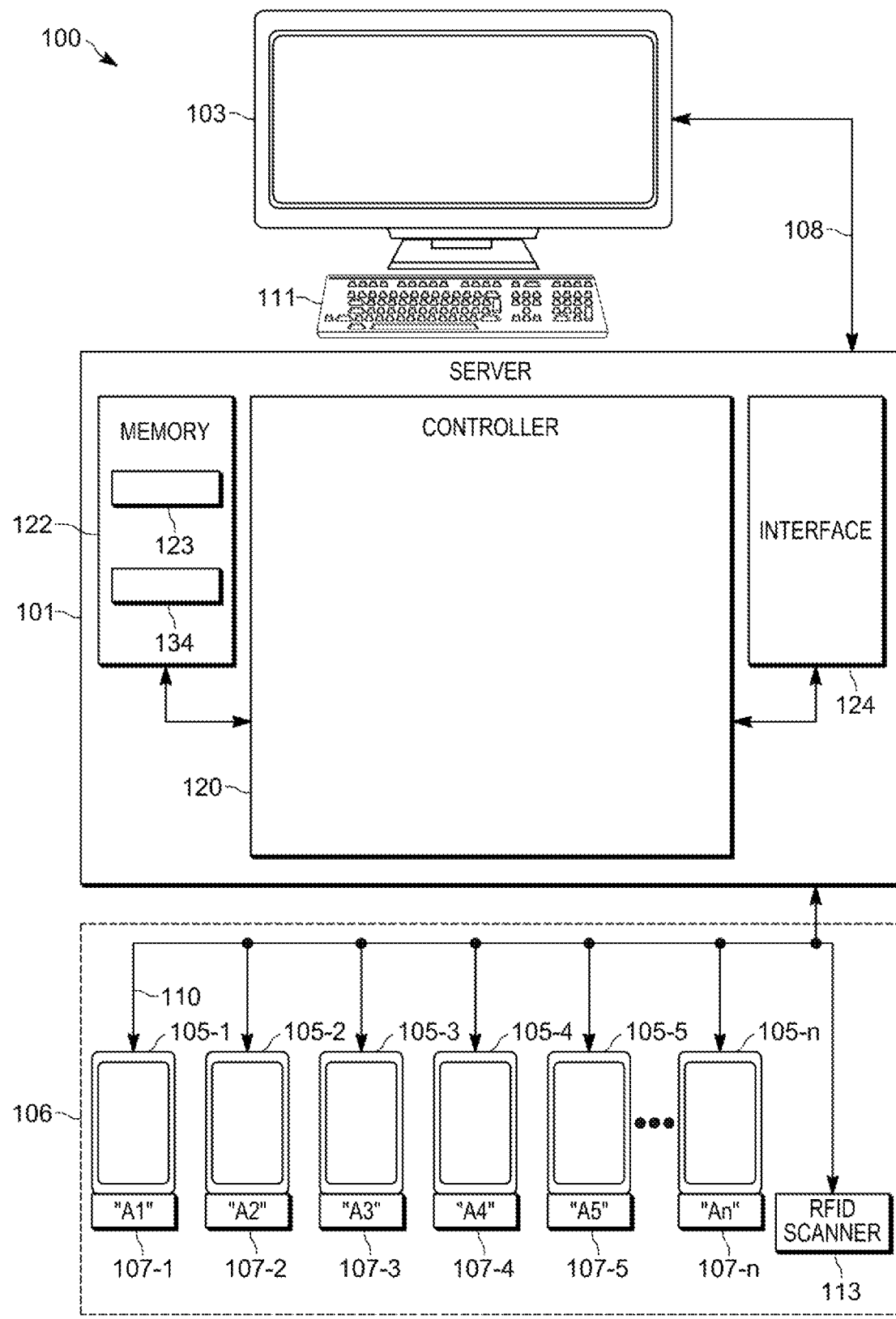
FIG. 1 is a block diagram of a mobile device provisioning system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a server comprising: a memory storing information associated with user identifiers; a communication interface; and a controller configured to: receive, using the communication interface, a user identifier; assign an available mobile device, of a plurality of shared mobile devices, to the user identifier, the available mobile device storing respective information associated with the user identifier; and control, via the communication interface, an output device to provide an indication of an assignment of the available mobile device.

Another aspect of the specification provides a method comprising: receiving, at a controller, using a communication interface, a user identifier; assigning, at the controller, an available mobile device, of a plurality of shared mobile devices, to the user identifier, the available mobile device storing respective information associated with the user identifier; and controlling, via the communication interface, an output device to provide an indication of an assignment of the available mobile device.

FIG. 1 is a block diagram of a system 100 that includes a server 101, an output device 103, and a plurality of shared mobile devices 105-1, 105-2, 105-3, 105-4, 105-5, . . . 105-*n*. The plurality of shared mobile devices 105-1, 105-2, 105-3, 105-4, 105-5, . . . 105-*n* will be interchangeably referred to hereafter, collectively, as devices 105, and generically as a device 105. Further, as depicted, each of the devices 105 are located at least one storage facility 106, for example at a public safety organization and the like.

A number "n" of the devices 105 may include as few as one device 105, but may include tens, hundreds and even thousands of devices 105 depending, for example, on a number of devices 105 being managed for users and/or first responders and/or emergency responders within the system 100.

In addition, each of the devices 105 are located at a respective battery charger 107-1, 107-2, 107-3, 107-4, 107-5, . . . 107-*n*. The plurality of battery chargers 107-1, 107-2, 107-3, 107-4, 107-5, . . . 107-*n* will be interchangeably referred to hereafter, collectively, as chargers 107, and generically as a charger 107. The chargers 107 are generally used to charge a battery of a respective device 105 and may alternatively be configured as indicator devices to provide an indication of a location of a respective device 105, as described in more detail below. The chargers 107 may alternatively configured to determine whether a respective device 105 is present, or not, and return an indication of such to the server 101, for example when queried by the server 101.

In addition, a location of each of the devices 105 is optionally indicated in the storage facility via a respective alphanumeric label. For example, the device 105-1 is located at a location labelled as "A1", the device 105-2 is located at a location labelled as "A2" etc.

As depicted, the output device 103 is in communication with the server 101, using a link 108; similarly, the devices 105 and/or the chargers 107 are in communication with the server 101, using respective links 110. However, the chargers 107 may be in communication with the server 101 via a respective device 105 (e.g. the server 101 may transmit data and the like to a charger 107 by transmitting the data to a respective device 105, which passes the data, and the like, to a charger 107 via a wired and/or wireless link therebetween, the wired and/or wireless link generally used for charging). While the links 108 will be described below as providing communications between the server 101 and the devices 105, the links 110 are understood to alternatively provide communications between the server 101 and the chargers 107.

As described in examples herein, the server 101 may assign one or more of the devices 105 to a user identifier received at the server 101 based on information stored at the devices 105 in order to reduce transmission of information from the server 101 to an assigned device 105.

Hence, in specific embodiments, the system 100 comprises components of a mobile device provisioning system, including, but not limited to, a mobile device provisioning system used to assign mobile devices to first responders and/or emergency responders working for and/or with a public safety organization (generically referred to hereafter as first responders and/or users), and the server 101 comprises one or more mobile device provisioning servers, and the like, including, but not limited to, personal computers, laptop computers, and the like. Such mobile device provisioning servers, and the like, control mobile device provisioning, and optionally manage communications to and from the devices 105. As such, the server 101 may store records of respective information associated with user identifiers stored at the devices 105; and/or the user identifiers previously assigned and/or most recently assigned to the plurality of shared devices 105. Such information may be used to determine which device 105 to assign to a user identifier used to log-in to the server 101, for example during a shift change.

For example, as depicted the output device 103 comprises a display device (e.g. a flat panel display and the like), and further includes an input device 111 (e.g. a keyboard (as depicted), a touch screen at the display device, a pointing device, and the like). Indeed, the output device 103, together with the input device 111, may comprise a log-in terminal that a first responder may use to log-in to the server 101 during a shift change (and/or log-out after a shift) in order to have a device 105 assigned to their user credentials. For example, the first responder may use the input device 111 to enter the respective user identifier which is transmitted to the server 101, which assigns a device 105 to the user credentials, as described hereafter, and controls the output device 103 to provide an indication of an assignment of the device 105. Indeed, the output device 103 may alternatively include a speaker, and/or any combination of output devices that can provide such an indication. The first responder may then proceed to the location of the assigned device 105, for example, as indicated in the indication of the assignment at the output device 103, and retrieve the assigned device 105 for use during a shift. Hence the devices 105 may be referred to as shared devices 105 as the devices 105 are shared between a plurality of first responders and/or users, and assigned on an as-needed basis. Indeed, when an assigned device 105 is returned to the storage facility 106, the assigned device 105 again becomes available for assignment to another first responder and/or user.

Furthermore, once a device 105 is assigned, the server 101 may transmit to the assigned device 105 data representing a difference between: respective information associated with the user identifier stored at the assigned device 105; and the information associated with the user identifier stored at a memory of the server 101.

As depicted, an optional radio-frequency identifier (RFID) scanner 113 is located at the storage facility 106, and in communication with the server 101 via a link 110; indeed, in the depicted implementations, each of the devices 105 may include an active RFID tag or a passive RFID tag, and the like, and the scanner 113 may be configured to assist the server 101 in determining whether a given device 105 is available for assignment from the storage facility 106 based on whether or not the scanner 113 is able to read a respective RFID tag (e.g. indicating whether a respective device 105 is present or absent from the storage facility 106). Indeed, the scanner 113 may periodically query the RFID tags of the devices 105 and transmit to the server 101 information indicating whether respective devices 105 are present or absent from the storage facility 106.

As depicted, the server 101 comprises: a controller 120, a memory 122, storing an application 123, and a communication interface 124, interchangeably referred to hereafter as the interface 124. The controller 120 is generally configured for communication with the output device 103 (including the input device 111), the devices 105, the chargers 107 (when present), and the scanner 113 (when present), using the communication interface 124.

The controller 120 is generally configured to: receive, using the communication interface 124, a user identifier; assign an available mobile device 105, of a plurality of shared mobile devices 105, to the user identifier, the available mobile device 105 storing respective information associated with the user identifier; and control, via the communication interface 124, the output device 103 to provide an indication of an assignment and location of the available mobile device 105. Indeed, the controller 120 may be configured to perform any functionality associated with a mobile device provisioning server.

The controller 120 includes one or more logic circuits, one or more processors, one or more microprocessors, one or more ASIC (application-specific integrated circuits) and one or more FPGA (field-programmable gate arrays). In some embodiments, the controller 120 and/or the server 101 is not a generic controller and/or a generic device, but a device specifically configured to assign a mobile device 105 to user credentials to reduce load on the server 101. For example, in some embodiments, the server 101 and/or the controller 120 specifically comprises a computer executable engine configured to implement mobile device assignment functionality.

The memory 122 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 1, programming instructions (e.g., machine readable instructions) that implement the functional teachings of the server 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to implement data mobile device assignment functionality associated with the application 123. In the illustrated example, when the controller 120 executes the application 123, the controller 120 is enabled to: receive, using the communication interface 124, a user identifier; assign an available mobile device 105, of a plurality of shared mobile devices 105, to the user identifier, the available mobile device 105 storing respective information associated with the user identifier; and control, via the communication interface 124, the output device 103 to provide an indication of an assignment and location of the available mobile device 105. Indeed, the controller 120 may be configured to perform any functionality associated with a mobile device provisioning server.

As depicted, the memory 122 further stores data 134 used by the server 101 and/or the controller 120 to assign a mobile device 105 to a user identifier. The data 134 will be described in more detail below with respect to FIG. 2. However, in some embodiments, the data 134 may be at least partially stored at another memory accessible to the controller 122 (e.g. at another server and/or another device), and the controller 120 is in communication with the other memory, and the data 134 stored at the other memory may be retrieved from the other memory upon request by the controller 120.

The interface 124 is generally configured to communicate with the output device 103, the devices 105, and, optionally, the chargers 107 and/or the scanner 113, using wired and/or wired links 108, 110 as desired, including, but not limited to, cables, WiFi links and the like. In other words, the links 108, 110 may include any suitable combination of wired networks and/or wireless networks.

In some embodiments, the interface 124 is further configured to communicate with the devices 105 for example, using one or more communication channels over the links 110. In these embodiments, the interface is implemented by, for example, one or more radios and/or connectors and/or network adaptors, configured to communicate wirelessly, with network architecture that is used to implement one or more communication channels between the server 101 and the device 105 and/or a wireless network. In these embodiments, the interface 124 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 124 includes one or more local area network or personal area network transceivers operating in accordance with an IEEE 902.11 standard (e.g., 902.11a, 902.11b, 902.11g, and the like), or a Bluetooth™ transceiver which may be used to communicate with the output device 103, the devices 105, and, optionally, the chargers 107 and/or the scanner 113. In some embodiments, the interface 124 is further configured to communicate "radio-to-radio" on some communication channels (e.g. in embodiments where the interface 124 includes a radio), while other communication channels are configured to use wireless network infrastructure.

Example communication channels over which the interface 124 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 124 communicates with the output device 103, the devices 105, and, optionally, the chargers 107 and/or the scanner 113 using other servers and/or communication devices, for example by communicating with the other servers and/or communication devices using, for example, packet-based and/or internet protocol communications, and the like, and the other servers and/or communication devices use radio communications to wirelessly communicate with the output device 103, the devices 105, and, optionally, the chargers 107 and/or the scanner 113.

Indeed, communication between the server 101, the output device 103, the devices 105, and, optionally, the chargers 107 and/or the scanner 113, may further include any suitable combination of wired networks and/or wireless networks. In other words, the links 108, 110 may include any suitable combination of wired networks and/or wireless networks.

Hence, the server 101 may be remote from one or more of the output device 103 and the devices 105. Indeed, the output device 103 may be located at and/or in the storage facility 106, and the server 101 may be remote from the storage facility 106.

In any event, it should be understood that a wide variety of configurations for the system 100 and/or the server 101 are within the scope of present embodiments.

Figure 2:
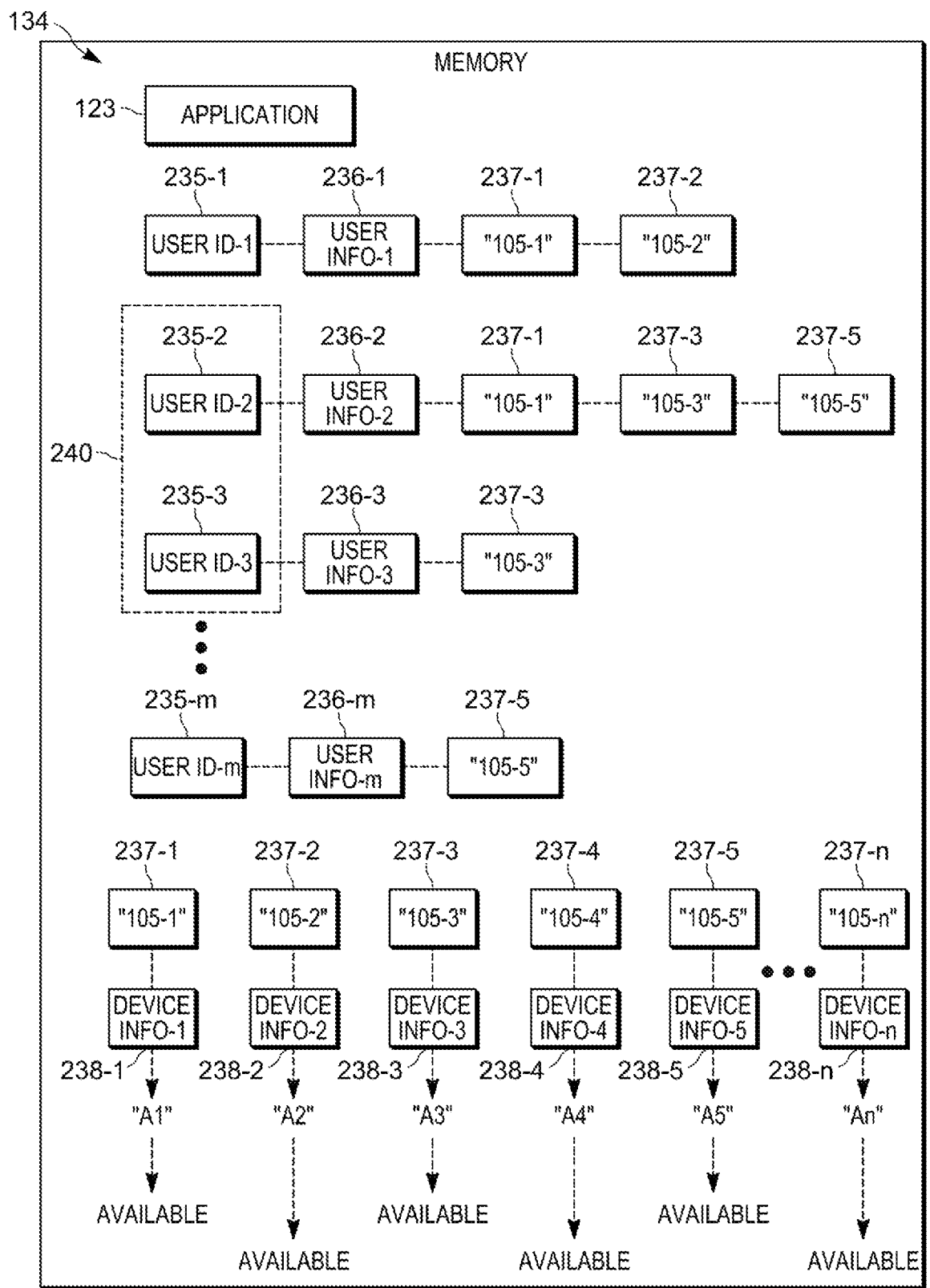
FIG. 2 is a block diagram of a memory of a server in the mobile device provisioning system of FIG. 1 in accordance with some embodiments.

Attention is next directed to FIG. 2 which depicts an example of the data 134 stored at the memory 122. In particular, the data 134 includes a plurality of user identifiers 235-1, 235-2, 235-3 . . . 235-$m$ stored in association with respective associated information 236-1, 236-2, 236-3 . . . 236-$m$. The plurality of user identifiers 235-1, 235-2, 235-3

... 235-*m* will be interchangeably referred to hereafter, collectively, as user identifiers 235, and generically as a user identifier 235; similarly, the respective associated information 236-1, 236-2, 236-3 ... 236-*m* will be interchangeably referred to hereafter, collectively and generically, as user information 236 and/or as information 236. Furthermore, each of the user identifiers 235 is indicated in FIG. 2 via respective text "User ID-m" and the information 236 is indicated via respective text "User INFO-m".

A number "m" of the user identifiers 235 may include as few as one user identifier 235, but may include tens, hundreds and even thousands of user identifiers 235 depending, for example, on a number of users and/or first responders and/or emergency responders being managed within the system 100.

Each of the user identifiers 235 may hence include, but is not limited to, an employee number of a first responder (and the like), an email address of a first responder, a badge number of a first responder, and the like.

The respective user information 236 stored in association with the user identifiers 235 (as indicated by the broken lines therebetween) comprises information that is to be made available to a first responder, and the like at an assigned device 105, and which may include, but is not limited to: contacts, groups, roles, messages, applications, application data, and the like. Indeed, the respective user information 236 may further comprise data that had been stored at a device 105 that had been previously assigned, and/or most recently assigned, to the first responder, for example during a previous shift, as well as any information received at the server 101 between shifts and/or between log-in events at the server 101, and/or while the first responder was logged out of the server 101. Indeed, the server 101 may be generally configured to track and/or receive messages, email, incident reports, application data, and the like for first responders and store such information until the first responder next logs in. Indeed, the server 101 may further be configured to manage data and/o messaging for the devices 105 and hence all data and/or messages transmitted to and/or from the devices 105 are received at the server 101.

However, the server 101 and/or the controller 120 may also be further configured to: receive, from the devices 105, mobile device data received at the devices 105 that was not previously received via the controller 120; and, store the mobile device data at the memory 122 in the information 236 associated with the user identifiers 235. For example, one or more of the devices 105 may receive data from other devices and/or via a respective input device (e.g. in the form of reports and the like) and any such data may be transmitted to the server 101 for storage and/or management.

As depicted, the data 134 stored at the memory 122 further includes a plurality of device identifiers 237-1, 237-2, 237-3 ... 237-*n* stored in association with respective associated information 238-1, 238-2, 238-3 ... 238-*n*. The plurality of device identifiers 237-1, 237-2, 237-3 ... 237-*n* will be interchangeably referred to hereafter, collectively, as device identifiers 237, and generically as a device identifier 237; similarly, the respective associated information 238-1, 238-2, 238-3 ... 238-*n* will be interchangeably referred to hereafter, collectively and generically, as device information 238 and/or as information 238. Furthermore, each of the device identifiers 237 is indicated in FIG. 2 via respective text "105-*n*"; hence, for example, the device identifier 237-1, indicated using "105-1", identifies device 105-1. Similarly, the information 238 is indicated via respective text "device INFO-m", such that information 238-1 comprises information stored on the device 105-1.

The device identifiers 237 generally identify a respective device 105, and may include, but is not limited to a respective MAC (media access control) identifier, an RFID identifier, an assigned identifier (e.g. an inventory identifier) and the like.

The associated information 238 comprises information stored on a respective device 105 and may include, but is not limited to, contacts, groups, roles, messages, applications, application data. Indeed, the associated information 238 may comprise data that had been provisioned to a respective device 105 during one or more previous shifts.

Indeed, any of the devices 105 may have been previously assigned, and/or most recently assigned, to any of the user identifiers 235, and furthermore the server 101 may store a record of the user identifiers 235 previously assigned, and/or most recently assigned, to the plurality of shared devices 105.

Hence, as depicted, each of the user identifiers 235 are further stored in association with respective device identifiers 237 identifying devices 105 previously assigned, and/or most recently assigned, to a user identifier 235. For example, as depicted, the user identifier 235-1 had previously been assigned the devices 105-1, 105-2, as indicated by the respective device identifiers 237-1, 237-2 being associated with the user identifier 235-1 (as indicated by the broken lines between the associated user information 236-1 and the device identifiers 237-1, 237-2). In FIG. 2, as the device identifier 237-1 is shown as being closer to the user identifier 235-1, it is understood that the associated device 105-1 was most recently assigned to the user identifier 235-1, while the device 105-2 was assigned to the user identifier 235-1 prior to the device 105-1.

Similarly, the devices 105-1, 105-3, 105-5, respectively identified by the device identifiers 237-1, 237-3, 237-5 were previously assigned (and/or most recently assigned) to the user identifier 235-2, with the device 105-1 being the most recently assigned device 105-1. Similarly, the device 105-3, identified by the device identifier 237-3, was previously assigned (and/or most recently assigned) to the user identifier 235-3, and the device 105-5, identified by the device identifier 237-5, was previously assigned (and/or most recently assigned) to the user identifier 235-*m*. Furthermore, while, as depicted, records of the three most recently assigned devices 105 are stored, in other embodiments records of more than three, or fewer than three, of the most recently assigned devices 105 are stored.

Furthermore, as depicted, the user identifiers 235-2, 235-3 are stored as a group 240 indicating that the user identifiers 235-2, 235-3 are associated; for example, the user identifiers 235-2, 235-3 may be assigned to respective first responders that are partners and/or that work together. Hence, the user information 236-2, 236-3, 236-5 may be similar. Hence, the controller 120 may alternatively determine that the device information 238-2 (e.g. of the device 105-2 previously assigned (and/or most recently assigned) to the user identifier 235-2) may be associated with the user identifier 235-3.

Such groupings of user identifiers 235 may include, but are not limited to, hierarchical relationships, organization relationships, talkgroups, and the like.

Alternatively, each of the device identifiers 237 may be stored in association with a list of previous user identifiers 235 assigned thereto.

Regardless, the memory 122 may store one or more of: a record of the respective information 236 associated with a user identifier 235 stored at an available mobile device 105; and the user identifiers 235 previously assigned (and/or most recently assigned) to the plurality of shared devices 105. As depicted, each user identifier 235 along with associated user information 236 and associated device identifiers 237 may be stored in a respective record.

As will be described below, by comparing the user information 236 associated with user identifiers 235, and device information 238 associated with device identifiers 237 previously assigned (and/or most recently assigned) to the user identifiers 235, the controller 120 may determine which of the devices 105 store respective information 238 associated with a user identifier 235.

Such a determination may occur by one or more of: assigning an available mobile device 105 based on a most recently assigned device 105, devices 105 previously assigned to a group (such as the group 240), and a smallest difference between stored user information 236 and stored device information 238, each described in further detail below.

As depicted, each of the device identifiers 237 are further stored in association with a respective indicator of their location similar to the labels "A1", "A2", etc. depicted in FIG. 1.

As depicted, each of the device identifiers 237 are further stored in association with a respective indicator (e.g. "Available") indicating whether or not an associated device 105 is available for assignment or not available for assignment. For example, as devices 105 are assigned, unassigned and/or removed from, and returned to, the storage facility 106, the controller 120 may update each associated indicator to indicate that a device 105 is "Available" or "Not Available" (e.g. see FIG. 9). Whether or not a device 105 is present at the storage facility may, in some embodiments, be determined by receiving data from the scanner 113 and/or by querying the chargers 107.

Figure 3:
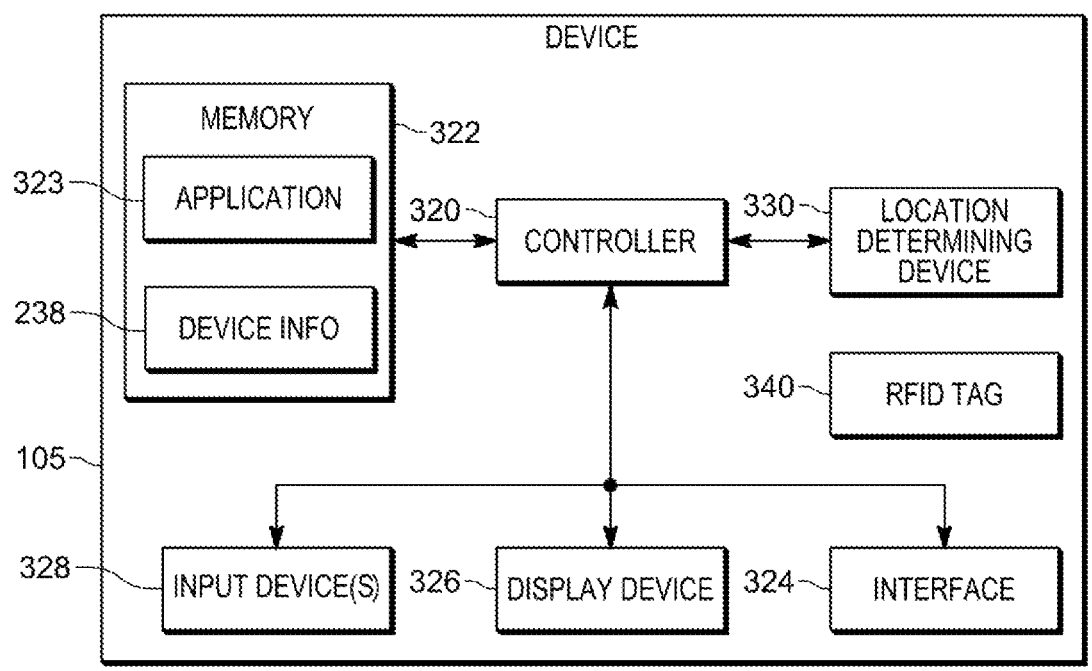
FIG. 3 is a block diagram of a memory of a mobile device in the mobile device provisioning system of FIG. 1 in accordance with some embodiments.

Attention is next directed to FIG. 3 which depicts a block diagram of an example device 105.

Each of the devices 105 generally comprises a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-scanners, mobile camera devices and the like.

In some embodiments, one or more of the devices 105 are specifically adapted for use as a public safety device and may be deployed and/or managed by a public safety and/or first responder agency including, but not limited to, police organizations, health organizations, intelligence organizations, military organizations, government organizations, and the like.

Indeed, in some embodiments, one or more of the devices 105 are specifically adapted for emergency service radio functionality, and the like, used by emergency responders and/or emergency responders, including, but not limited to, police service responders, fire service responders, emergency medical service responders, and the like. In some of these embodiments, the devices 103 further includes other types of hardware for emergency service radio functionality, including, but not limited to, push-to-talk ("PTT") functionality.

However, the devices 105 may further be adapted for use as a consumer device and/or business device, and the like, and/or may include additional or alternative components related to, for example, telephony, messaging, entertainment, and/or any other components that may be used with computing devices and/or communication devices.

As depicted in FIG. 3 an example device 105 comprises a respective controller 320, a memory 322 storing an application 323 and respective device information 238, and a communication interface 324, interchangeably referred to hereafter as the interface 324, and optionally a display device 326 (e.g. a flat panel display, and the like) and at least one input device 328 (e.g. a keyboard, a touch screen, a point device, buttons, and the like). The controller 320, the memory 322, and the interface 324 are each respectively similar to the controller 120, the memory 122 and the interface 124, adapted, however, for use in a mobile device. While not depicted, the device 105 may further include one or more speakers and/or one or more microphones and/or one or more lights and/or one or more haptic devices and/or one or more notification devices.

As depicted, the example device 105 further includes a location determining device 330 (e.g. a Global Positioning System device, and the like) and hence the device 105 may be configured to determine a current location and transmit the current location to the server 101.

As depicted, the example device 105 further includes an RFID tag 340 which may be queried by the scanner 113.

The application 323, when executed by the controller 320, enables the controller 320 1 to implement functionality of the mobile device 105 including, but not limited to, receiving data from the server 101 and/or the input device 328 (including log-in data, such as user credentials), transmitting data to the server 101, and updating the device information 238. Indeed, the device information 238 generally corresponds to respective device information 238 stored at the memory 122 of the server 101.

In any event, it should be understood that a wide variety of configurations for the devices 105 are within the scope of present embodiments.

Figure 4:
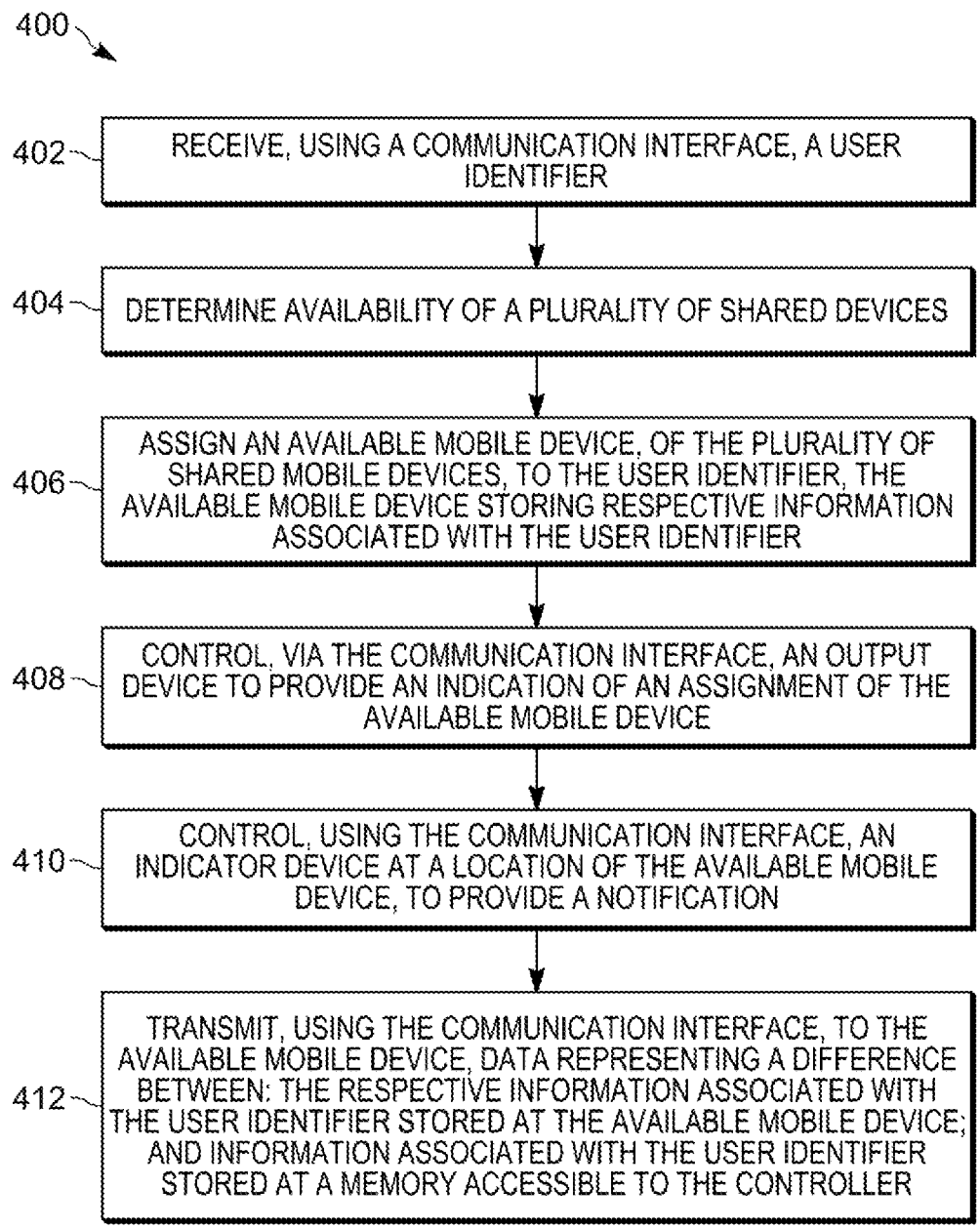
FIG. 4 is a flowchart of a method of controlling load on a server in accordance with some embodiments.

Attention is now directed to FIG. 4 which depicts a flowchart representative of a method 400 for controlling load on a server. In some embodiments, the operations of the method 400 of FIG. 4 correspond to machine readable instructions that are executed by, for example, the server 101 of FIG. 1, and specifically by the controller 120 of the server 101. In the illustrated example, the instructions represented by the blocks of FIG. 4 are stored at the memory 122, for example, as the application 123. The method 400 of FIG. 1 is one way in which the system 100 and/or the server 101 and/or the controller 120 is configured. Furthermore, the following discussion of the method 400 of FIG. 4 will lead to a further understanding of the server 101, and its various components.

However, it is to be understood that the system 100 and/or the server 101 and/or the controller 120 and/or the method 400 may be varied, and need not work exactly as discussed herein in conjunction with each other, and that such variations are within the scope of present embodiments.

Furthermore, the method 400 of FIG. 4 need not be performed in the exact sequence as shown and likewise various blocks may be performed in parallel rather than in sequence. Accordingly, the elements of method 400 are referred to herein as "blocks" rather than "steps".

At the block 402, the controller 120 receives, using the communication interface 124, a user identifier 235.

At the block 404, the controller 120 determines availability of the plurality of shared mobile devices 105.

At the block 406, the controller 120 assigns an available mobile device 105, of a plurality of shared mobile devices 105, to the user identifier 235, the available mobile device 105 storing respective information 238 associated with the user identifier 235. The blocks 404, 406 may be combined and/or the block 404 may be implemented inherently at the block 406.

At the block 408, the controller 120 controls, via the communication interface 124, the output device 103 to provide an indication of an assignment of the available mobile device 105.

At an optional the block 410, the controller 120 controls, via the communication interface 124, an indicator device at a location of the available mobile device 105, to provide a notification.

At the block 412, the controller 120 transmits, using the communication interface 124, to the available mobile device 105, data representing a difference between: the respective information 238 associated with the user identifier 235 stored at the available mobile device 105; and the information 236 associated with the user identifier 235 stored at the memory 122 (and/or a memory accessible to the controller 120).

The method 400 will now be described with reference to FIG. 5 to FIG. 14. FIG. 5, FIG. 6, FIG. 7, FIG. 8, FIG. 10, FIG. 12 and FIG. 14 are each substantially similar to FIG. 1, with like elements having like numbers.

Figure 5:
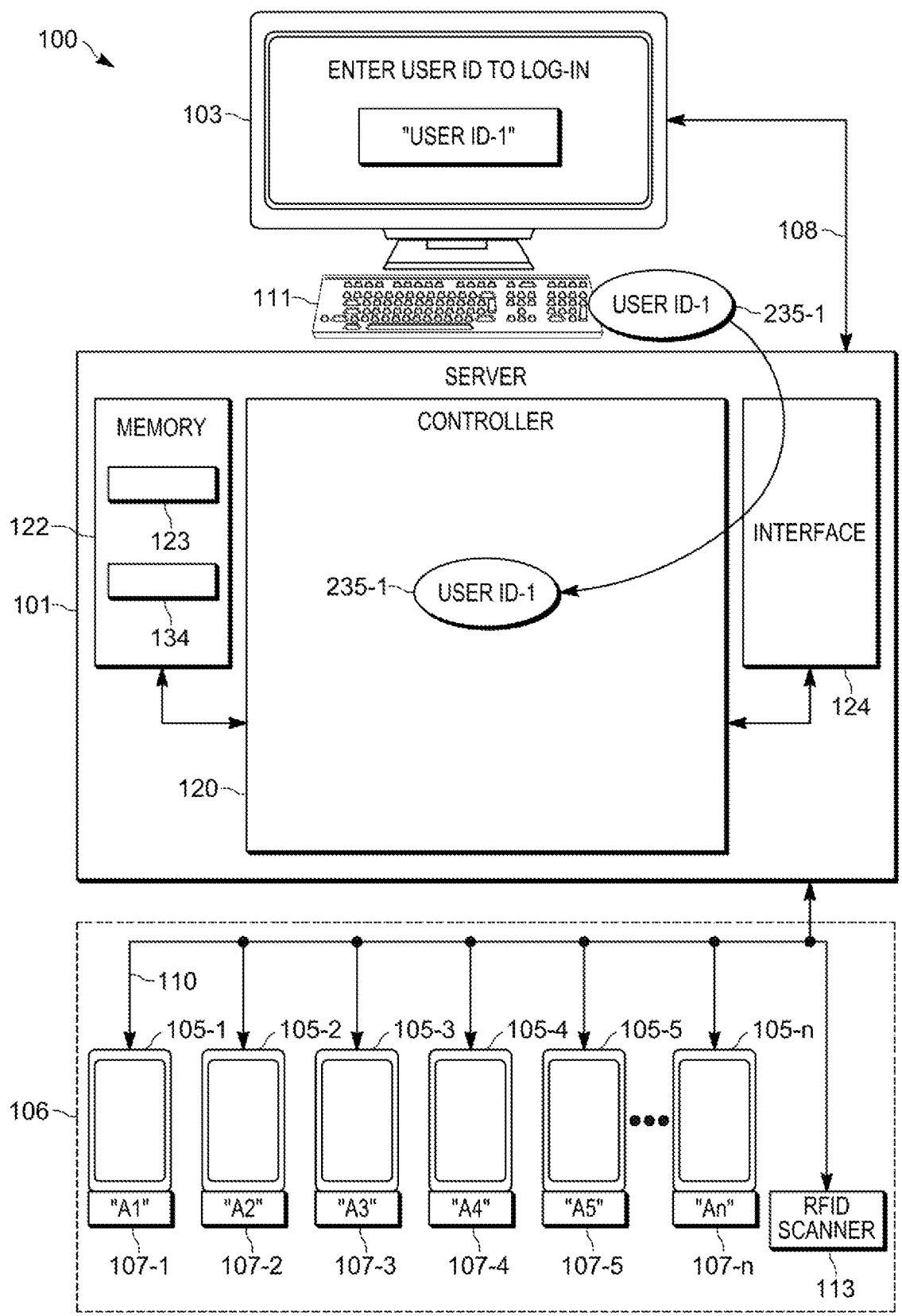
FIG. 5 depicts receipt of a user identifier in the server of the mobile device provisioning system of FIG. 1 in accordance with some embodiments.

Attention is first directed to FIG. 5 which depicts a user identifier 235-1 being received as input at the input device 111 (e.g. a first responder enters the user identifier 235-1) which is transmitted to the server 101 via the link 108, such that the user identifier 235-1 is received (e.g. the block 402 of the method 400) at the controller 120 via the interface 124. In general, receipt of the user identifier 235-1 may represent a log-in event at the server 101 during a shift change. In FIG. 5, for example, the output device 103 is depicted as requesting a user identifier, and further provides feedback of the user identifier 235-1 (e.g. via the text "User ID-1") received at the input device 111.

Figure 6:
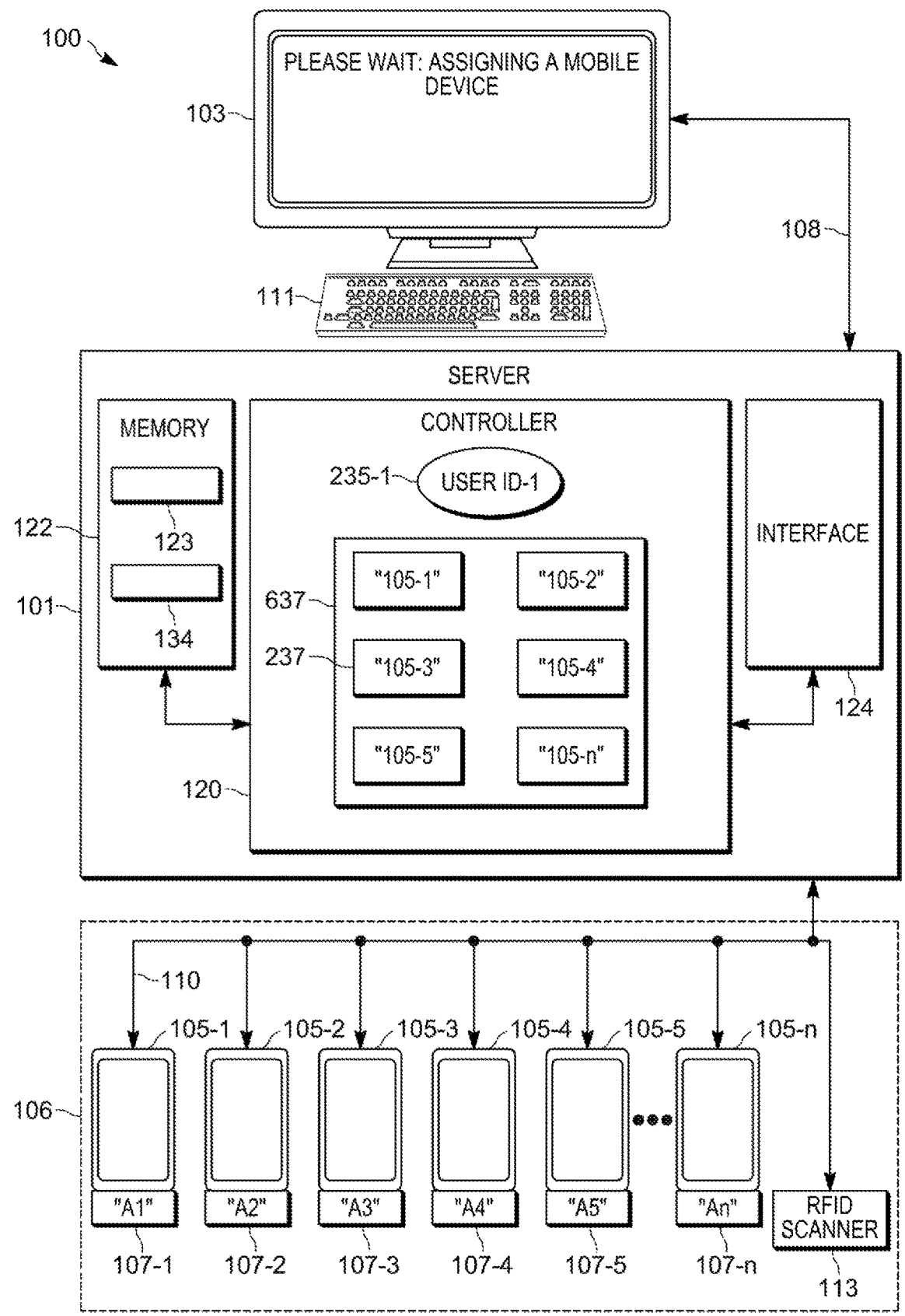
FIG. 6 depicts the server of the mobile device provisioning system of FIG. 1 determining availability of the mobile devices in accordance with some embodiments.

Attention is next directed to FIG. 6 which depicts the controller 120 determining (e.g. at the block 404 of the method 400) availability of the devices 105, for example by generating a list 637 of device identifiers 237 associated with available devices 105 based, for example, on the "Available" and "Not Available" indicators stored in the memory 122. As all the devices 105 are presently available, all the device identifiers 237 are present in the list 637. However, when a device 105 is not available, (e.g. due to a device 105 having been previously assigned and/or the device 105 being determined to be not in the storage facility 106 using the scanner 113 and/or the chargers 107), a respective device identifier 237 is not in the list 637.

Furthermore, the block 404 of the method 400 may be implemented without generating the list 637; rather the controller 120 may alternatively query the memory 122 to determine available devices 105.

Furthermore, the output device 103 is depicted as providing a notification that the server 101 is in the process of assigning a mobile device 105 to the user identifier 235-1, however such a notification is optional.

Figure 7:
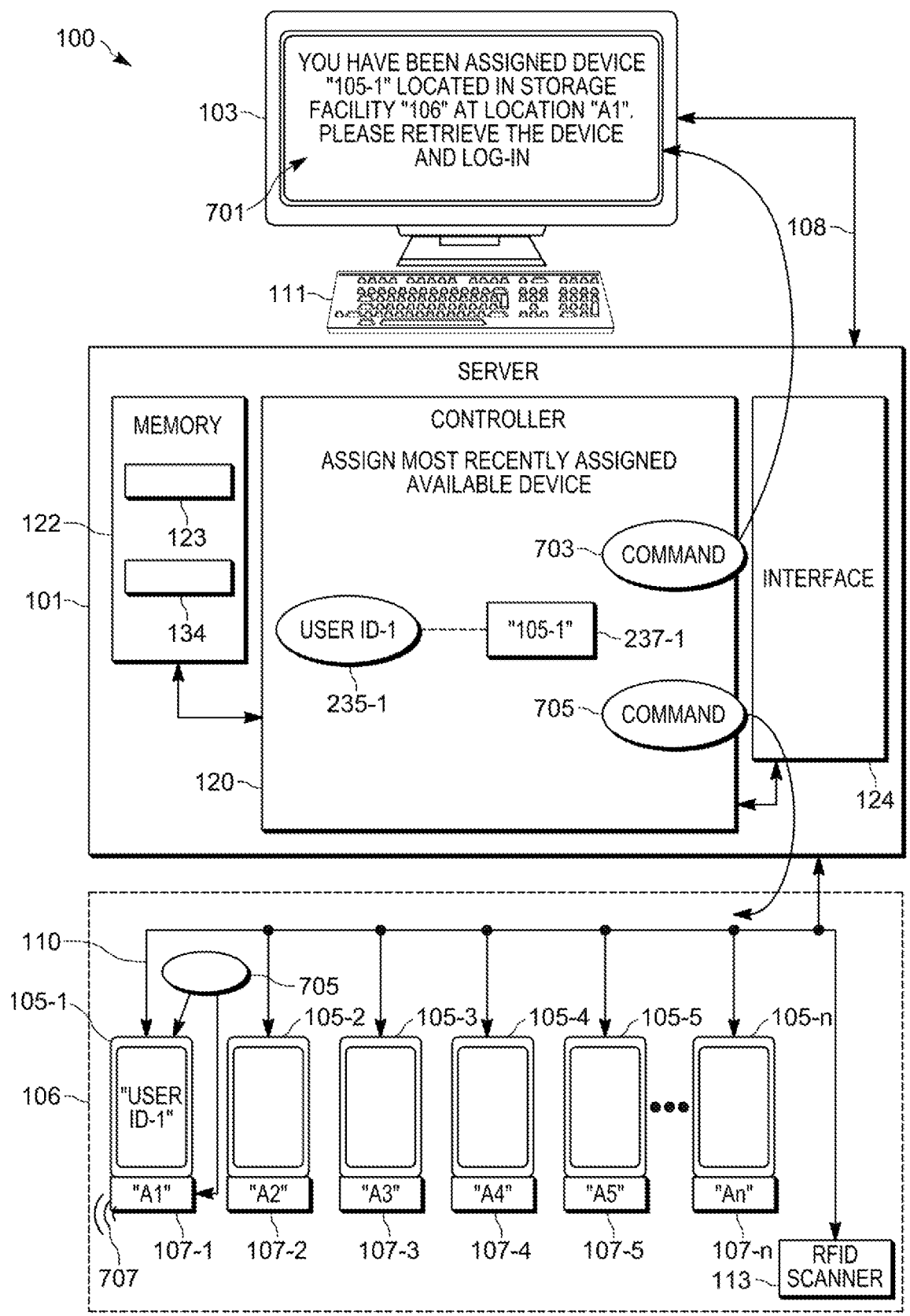
FIG. 7 depicts the server of the mobile device provisioning system of FIG. 1 assigning an available mobile device to the user identifier based on a most recently assigned available mobile device in accordance with some embodiments.

Attention is next directed to FIG. 7 which depicts an example of the controller 120 assigning (e.g. at the block 406 of the method 400) an available mobile device 105, of the plurality of shared mobile devices 105, to the user identifier 235-1. With further reference to FIG. 2, in the depicted example, the controller 120 assigns the available mobile device 105-1 storing the respective information 238-1 associated with the user identifier 235-1 by: determining a subset of the plurality of shared mobile devices 105, which were previously assigned, and/or most recently assigned, to the user identifier 235-1; and selecting the available mobile device 105-1 from the subset.

For example, the devices 105-1, 105-2 were previously assigned to the user identifier 235-1 and, as the device 105-1 was most recently assigned and is also available, the device 105-1 is assigned to the user identifier 235-1.

However, when the device 105-1 is not available (e.g. the device 105-1 was assigned to another user identifier 235 and/or is not present at the storage facility 106), the device 105-2 may be assigned to the user identifier 235-1.

FIG. 7 further depicts the controller 120 controlling (e.g. at the block 408 of the method 400) the output device 103 to provide an indication 701 of the assignment of the available mobile device 105-1; for example, as depicted, the controller 120 is transmitting control instructions to the output device 103, in the form a command 703 transmitted via the interface 124 and the link 108, to control the output device 103 to render text "You Have Been Assigned Device "105-1" Located In Storage Facility "106" at Location "ABC". Please Retrieve The Device and Log-In". As depicted, the indication 701 includes the identifier 237-1 of the device 105-1, as well a location "A1" of the device 105-1 in the storage facility 106.

FIG. 7 further depicts the controller 120 controlling (e.g. at the optional block 410 of the method 400) an indicator device at a location "A1" of the available mobile device 105-1, to provide a notification. For example, as depicted, the controller 120 is transmitting control instructions to the available mobile device 105-1 and/or the associated battery charger 107-1, in the form of a command 705 transmitted via the interface 124 and the links 110 to one or more of: control the respective display device 326 at the available mobile device 105-1 to render text "User ID-1", indicating that the available mobile device 105-1 is to be retrieved by the first responder having the user identifier 235-1; and control the battery charger 107-1 to provide a notification 707 which may comprises an audio notification (e.g. a beep, the user identifier 235-1, and the like), assuming the battery charger 107-1 includes a speaker, and/or a visual notification (e.g. blinking light, the user identifier 235-1) assuming that the battery charger 107-1 includes a light and/or a display device.

In other words, the indicator device of the block 410 may include an indicator device at the available mobile device 105-1 (e.g. a display device, a speaker, a light), the battery charger 107-1 (e.g. a display device, a speaker, a light) and a dedicated indicator device (e.g. in addition to and/or in place of the battery charger 107-1).

Figure 8:
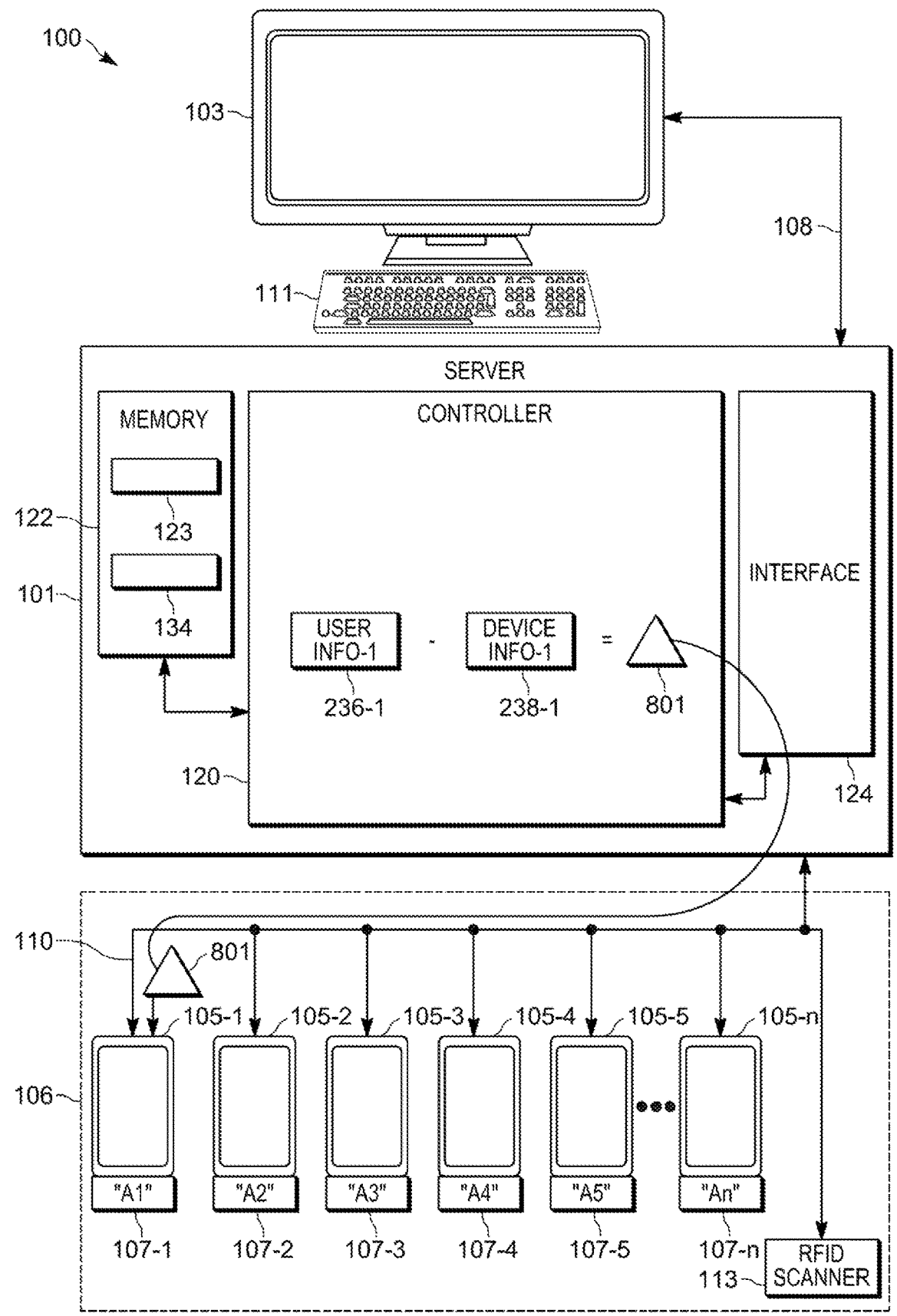
FIG. 8 depicts the server of the mobile device provisioning system of FIG. 1 transmitting a difference between stored user information and stored mobile device information to the assigned mobile device in accordance with some embodiments.

Attention is next directed to FIG. 8 which depicts the controller 120 determining a difference 801 between: the respective information 238-1 associated with the user identifier 235-1 stored at the available mobile device 105-1 (e.g. as retrieved from the memory 122); and the information 236-1 associated with the user identifier 125-1 stored at the memory 122. The difference 801 may include additional messages and/or reports and/or contacts, and the like, stored at the information 236-1 since a last time the first responder having the user identifier 235-1 logged out.

In any event, FIG. 8 further depicts the controller 120 transmitting (e.g. also at the block 412 of the method 400) the difference 801 to the available mobile device 105-1 using the interface 124 and the links 110. The device 105-1 then updates information 238-1 stored thereupon with the difference 801 to provision the device 105-1 for the first responder having the user identifier 235-1.

In this manner, the server 101 transmits the difference 801 and not all the of the user information 236-1 stored at the memory 122 thereby decreasing the load on the server 101 with respect to an amount of data transmitted, as compared to servers that transmit all the user information to a device upon log-in. When the method 400 is being implemented in the server 101 for thousands of devices during a shift change (e.g. using a plurality of output devices 103 and/or log-in terminals), the load on the server 101 decreases significantly.

Furthermore, the transmission of the difference 801 occurs upon assignment of the device 105-1; hence, while the first responder is moving (e.g. walks) to the location "A1" to retrieve the device 105-1, the device 105-1 receives the difference 801 and provisions the difference 801 thereupon. Hence, when the first responder arrives at the location "A1" the device 105-1 may be ready-to-go once the first responder logs in to the device 105-1.

However, in some implementations, the transmission of the difference 801 may not occur until the first responder logs into the device 105-1, and the device 105-1 requests the difference 801. Indeed, in these implementations, the server 101 and/or the controller 120 may be configured to transmit the difference 801 upon receipt of the user identifier 235-1 from the device 105-1 (e.g. after the assignment); such embodiments may ensure that the difference 801 is not transmitted until confirmation of the device 105-1 being used by the first responder is received, thereby reducing load on the server 101, though with delay in the provisioning of the device 105-1.

Attention is next directed to FIG. 9 which is substantially similar to FIG. 2, with like elements having like numbers, and depicts the data 134 stored at the memory 122 after the method 400 has been implemented as described with reference to FIG. 5, FIG. 6, FIG. 7 and FIG. 8. In particular, the status of the identifier 237-1 of the device 105-1 has been updated to "Not Available" and the device information 238-1 has been updated to include the difference 801.

Furthermore, the device 105-1 being currently assigned to the user identifier 235-1 is indicated in the data associated with the user identifier 235-1 (e.g. as depicted, the device identifier 237-1 stored in association with the user identifier 235-1 is marked as "Assigned").

Figure 10:
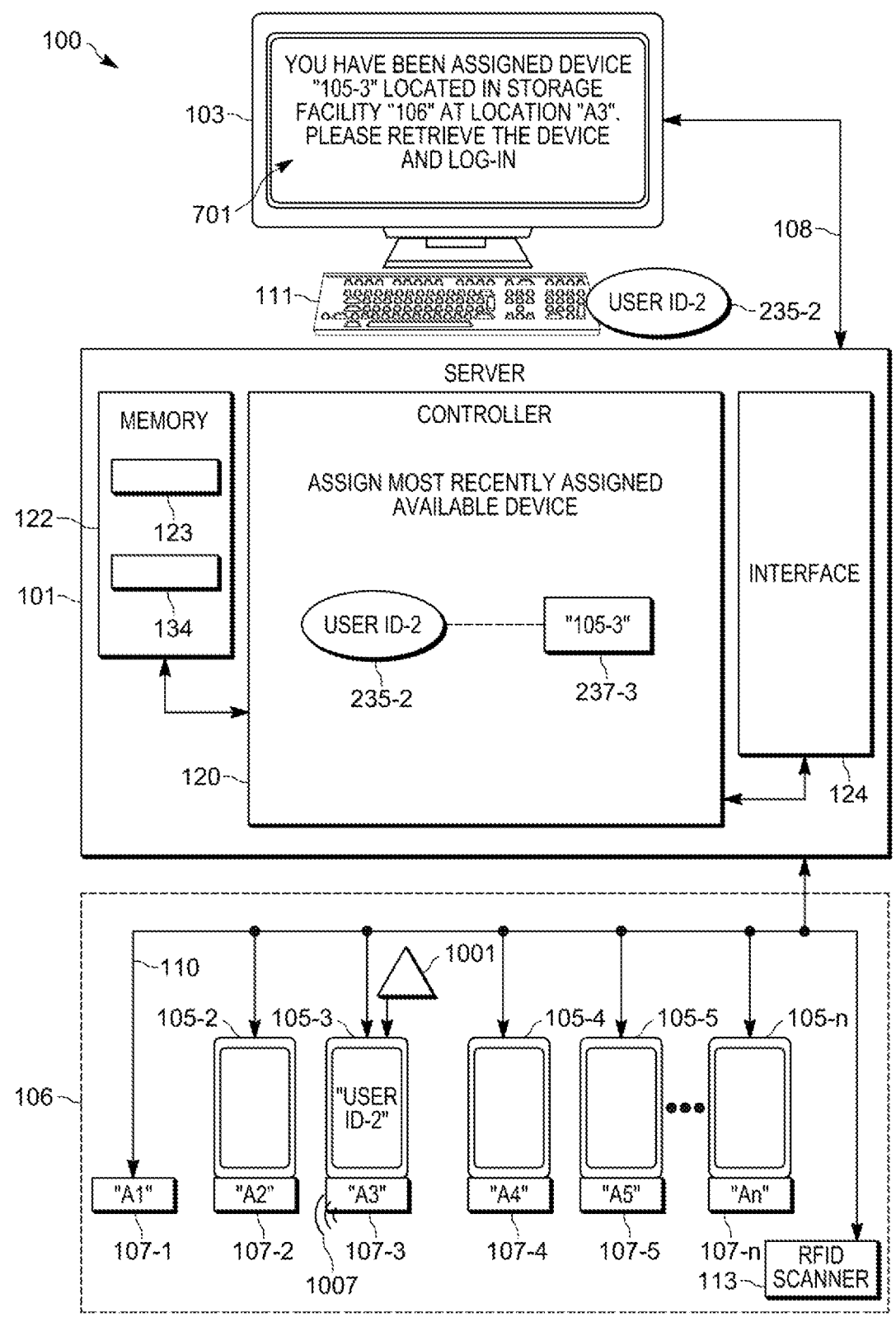
FIG. 10 depicts the server of the mobile device provisioning system of FIG. 1 assigning an available mobile device to a second user identifier based on a most recently assigned available mobile device in accordance with some embodiments.

Attention is next directed to FIG. 10 which depicts another example of the block 406 of the method 400. However, in FIG. 10 the user identifier 235-2 is being received at the input device 111; while not depicted, it is assumed in FIG. 10 that the user identifier 235-2 is received at the controller 120, and a list of available devices 105 may be generated (e.g. as in FIG. 5 and FIG. 6). Furthermore, in FIG. 10, the device 105-1 is not present as it is currently assigned to the user identifier 235-1 and has been retrieved from the storage facility 106. Nonetheless, the server 101 may continue to be in communication with the battery charger 107-1 via a respective link 110.

Figure 9:
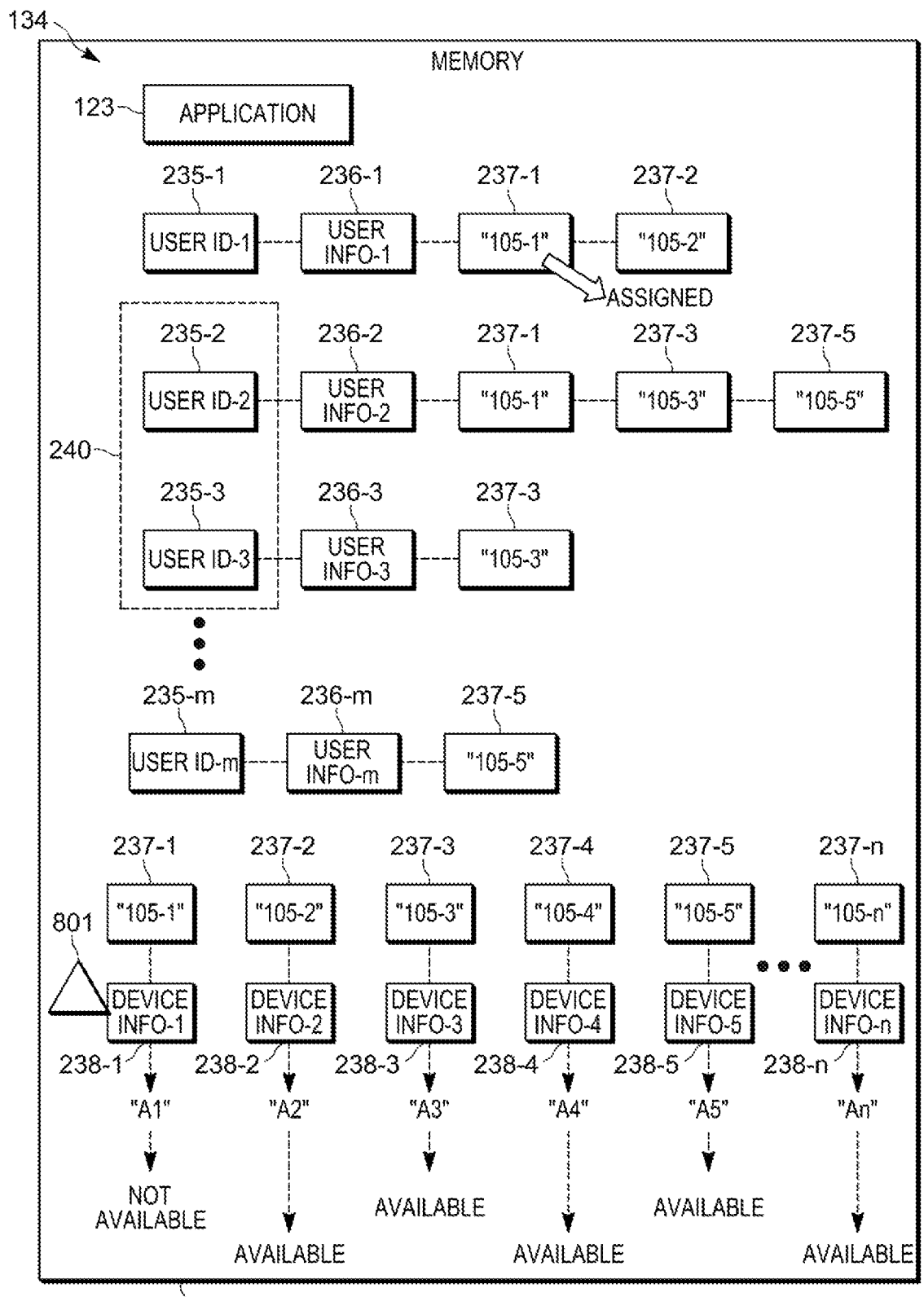
FIG. 9 depicts the memory of the server after the mobile device is assigned in accordance with some embodiments.

With further reference to FIG. 9, in the depicted example, the controller 120 assigns the available mobile device 105-3 storing the respective information 238-3 associated with the user identifier 235-3 by: determining a subset of the plurality of shared mobile devices 105, which were previously assigned, and/or most recently assigned, to the user identifier 235-3; and selecting the available mobile device 105-3 from the subset.

For example, the devices 105-1, 105-3 were previously assigned to the user identifier 235-2. However, while the device 105-1 was most recently assigned, the device 105-1 is not available (e.g. having been assigned to the user identifier 235-1). Hence, as the next most recently assigned device 105-3 is available, the device 105-3 is assigned to the user identifier 235-2.

Further, the controller 120 controls the output device 103 to provide an indication of the assignment.

Further, the controller 120 transmits, to the device 105-3, a difference 1001 between: the respective information 238-3 associated with the user identifier 235-2 stored at the available mobile device 105-3 (e.g. as retrieved from the memory 122); and the user information 236-2 associated with the user identifier 235-2 stored at the memory 122. The controller 120 may also control an indicator device at the location "A3" to provide a notification 1007 of the assignment.

Attention is next directed to FIG. 11 which is substantially similar to FIG. 9, with like elements having like numbers, and depicts the data 134 stored at the memory 122 after the method 400 has been implemented as described with reference to FIG. 10. In particular, the status of the identifier 237-3 of the device 105-1 has been updated to "Not Available" and the device information 238-3 has been updated to include the difference 1001. Furthermore, the order of the device identifiers 237 associated with the user identifier 235-2 has been updated to indicate that the device 105-3, identified by the device identifier 237-3, was most recently assigned to the user identifier 235-2.

Furthermore, the device 105-3 being currently assigned to the user identifier 235-2 is indicated in the data associated with the user identifier 235-2 (e.g. as depicted, the device identifier 237-3 stored in association with the user identifier 235-3 is marked as "Assigned").

Figure 12:
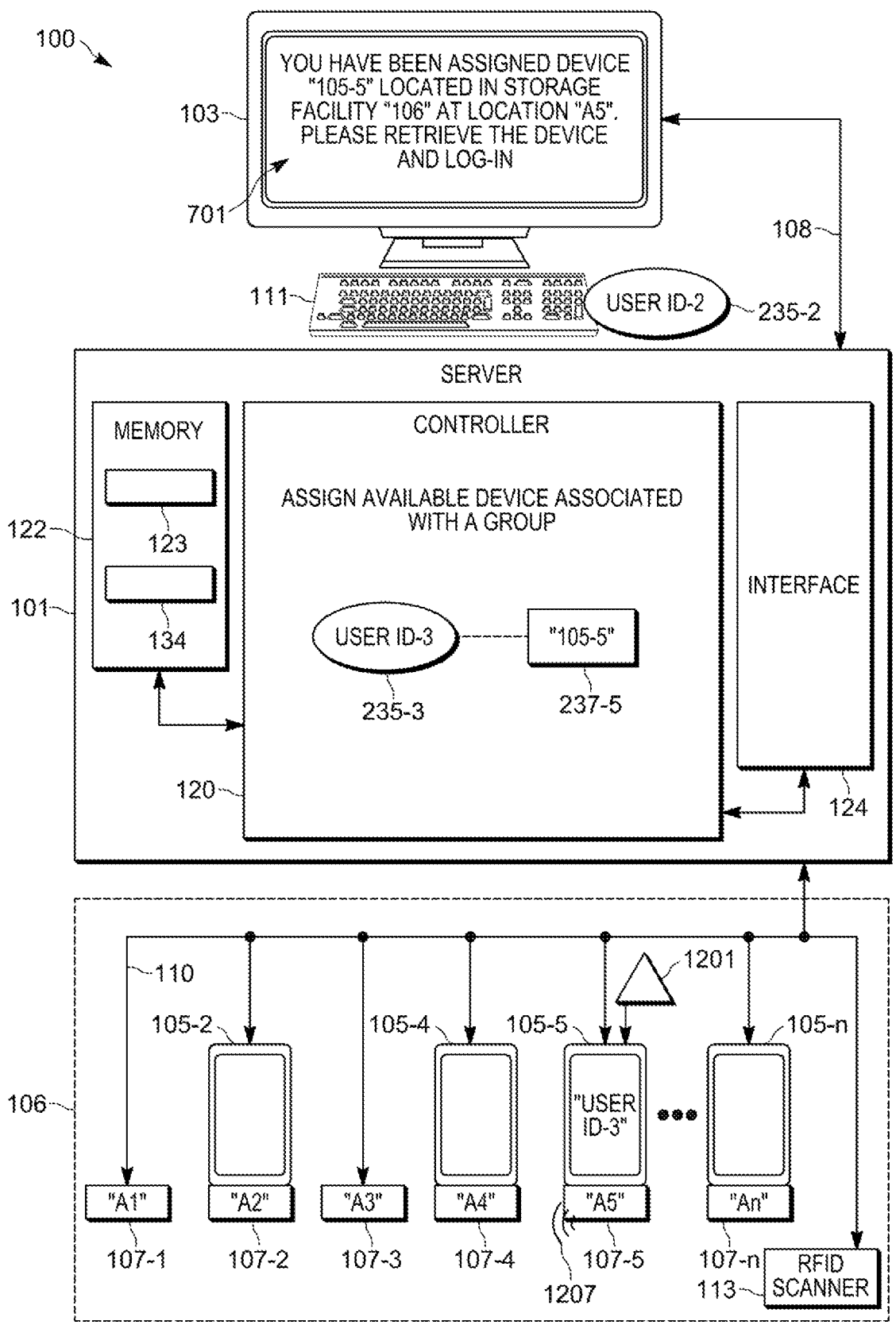
FIG. 12 depicts the server of the mobile device provisioning system of FIG. 1 assigning an available mobile device to a third user identifier based on group associations in accordance with some embodiments.

Attention is next directed to FIG. 12 which depicts another example of the block 406 of the method 400. However, in FIG. 12 the user identifier 235-3 is being received at the input device 111; while not depicted, it is assumed in FIG. 12 that the user identifier 235-3 is received at the controller 120, and a list of available devices 105 may be generated (e.g. as in FIG. 5 and FIG. 6). Furthermore, in FIG. 12, the device 105-3 is not present as it is currently assigned to the user identifier 235-2 and has been retrieved from the storage facility 106.

Figure 11:
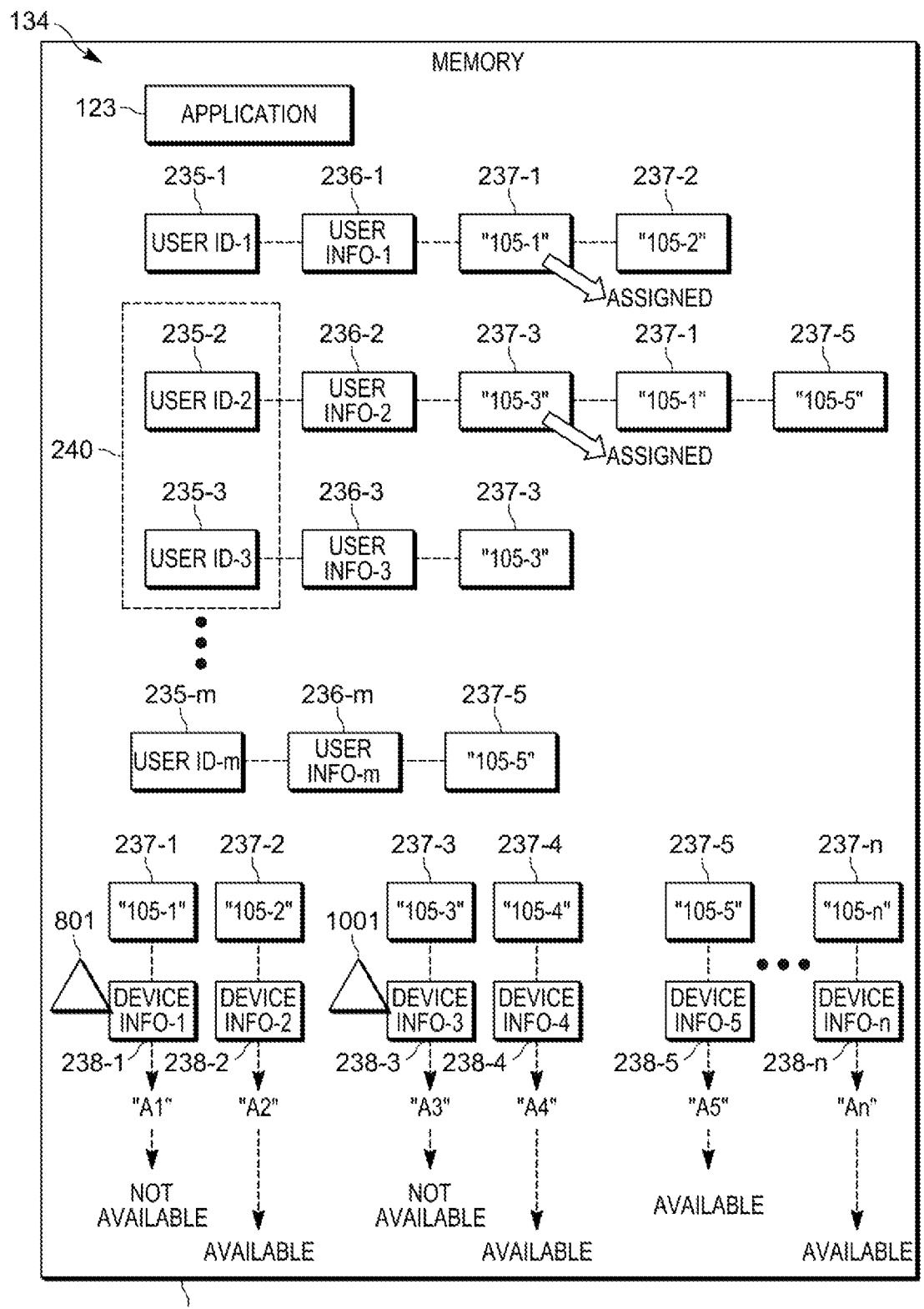
FIG. 11 depicts the memory of the server after a mobile device is assigned to the second user identifier in accordance with some embodiments.

With further reference to FIG. 11, in the depicted example, the controller 120 assigns the available mobile device 105-5 storing the respective information 238-5 associated with the user identifier 235-3 by: determining a group 240 of user identifiers 235-2, 235-3 that includes the user identifier 235-3; determining a subset of the plurality of shared mobile devices 105, associated with the user identifiers 235-2, 235-3 of the group 240; and selecting the available mobile device 105-5 from the subset. In particular, the subset of the plurality of shared mobile devices 105, associated with the user identifiers 235-2, 235-3 of the group 240 includes the devices 105-1, 105-3, 105-5. However, as the devices 105-1, 105-3 are not available, the device 105-5 is assigned to the user identifier 235-3.

Further, the controller 120 controls the output device 103 to provide an indication of the assignment.

Further, the controller 120 transmits, to the device 105-5, a difference 1201 between: the respective information 238-5 associated with the user identifier 235-3 stored at the available mobile device 105-5 (e.g. as retrieved from the memory 122); and the user information 236-3 associated with the user identifier 235-3 stored at the memory 122. The controller 120 may also control an indicator device at the location "A5" to provide a notification 1207 of the assignment.

Attention is next directed to FIG. 13 which is substantially similar to FIG. 11, with like elements having like numbers, and depicts the data 134 stored at the memory 122 after the method 400 has been implemented as described with reference to FIG. 12. In particular, the status of the identifier 237-5 of the device 105-1 has been updated to "Not Available" and the device information 238-5 has been updated to include the difference 1201. Furthermore, the order of the device identifiers 237 associated with the user identifier 235-3 has been updated to indicate that the device 105-5, identified by the device identifier 237-5, was most recently assigned to the user identifier 235-2.

Furthermore, the device 105-5 being currently assigned to the user identifier 235-3 is indicated in the data associated with the user identifier 235-3 (e.g. as depicted, the device identifier 237-5 stored in association with the user identifier 235-3 is marked as "Assigned").

Figure 14:
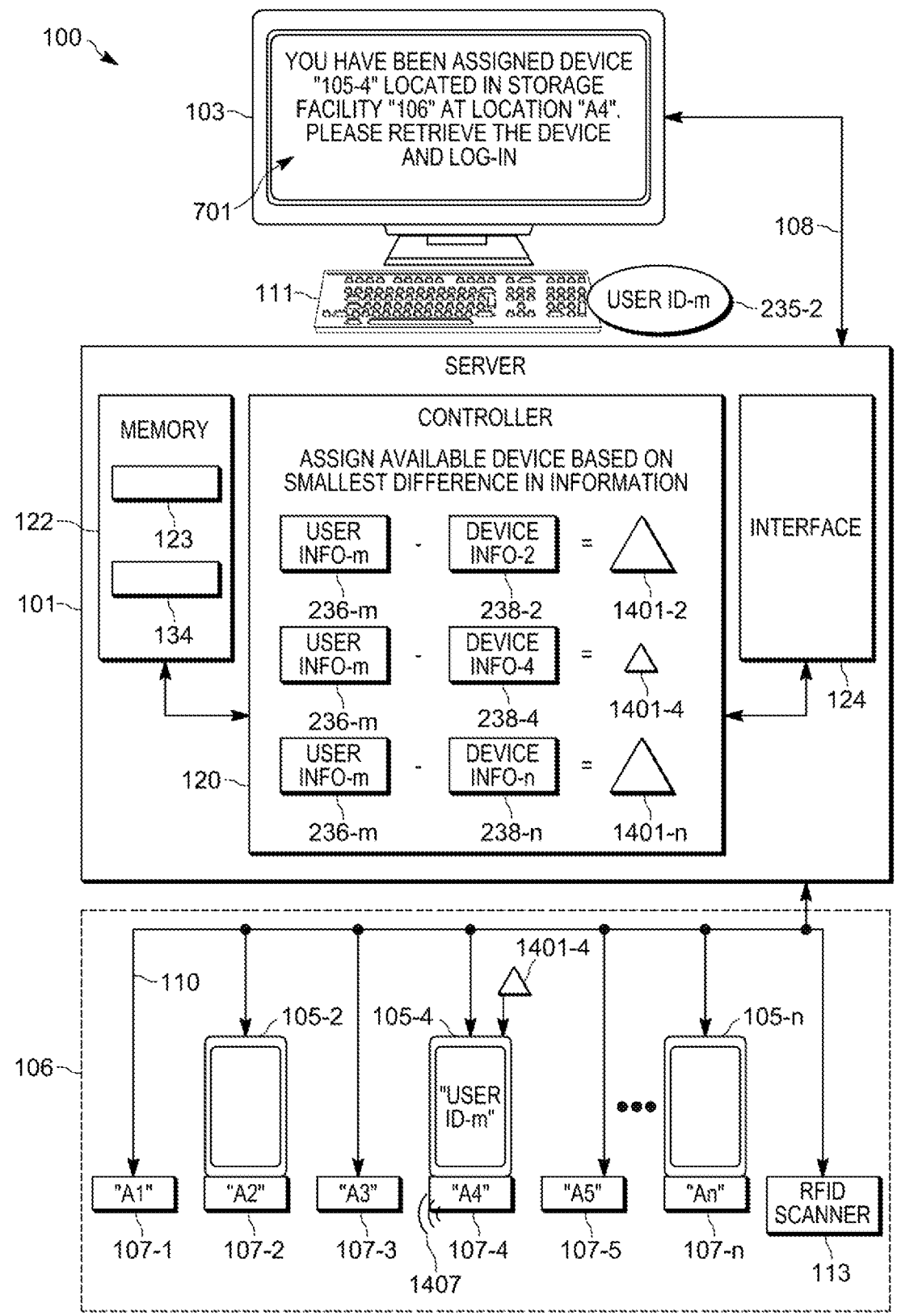
FIG. 14 depicts the server of the mobile device provisioning system of FIG. 1 assigning an available mobile device to a fourth user identifier based on a difference between stored user information and stored device information in accordance with some embodiments.

Attention is next directed to FIG. 14 which depicts another example of the block 406 of the method 400. However, in FIG. 14 the user identifier 235-$m$ is being received at the input device 111; while not depicted, it is assumed in FIG. 14 that the user identifier 235-$m$ is received at the controller 120, and a list of available devices 105 may be generated (e.g. as in FIG. 5 and FIG. 6). Furthermore, in FIG. 14, the device 105-5 is not present as it is currently assigned to the user identifier 235-3 and has been retrieved from the storage facility 106.

Indeed, the available devices 105 include only devices 105-2, 105-4 and 105-$n$ (assuming that all other devices 105 have been assigned).

Figure 13:
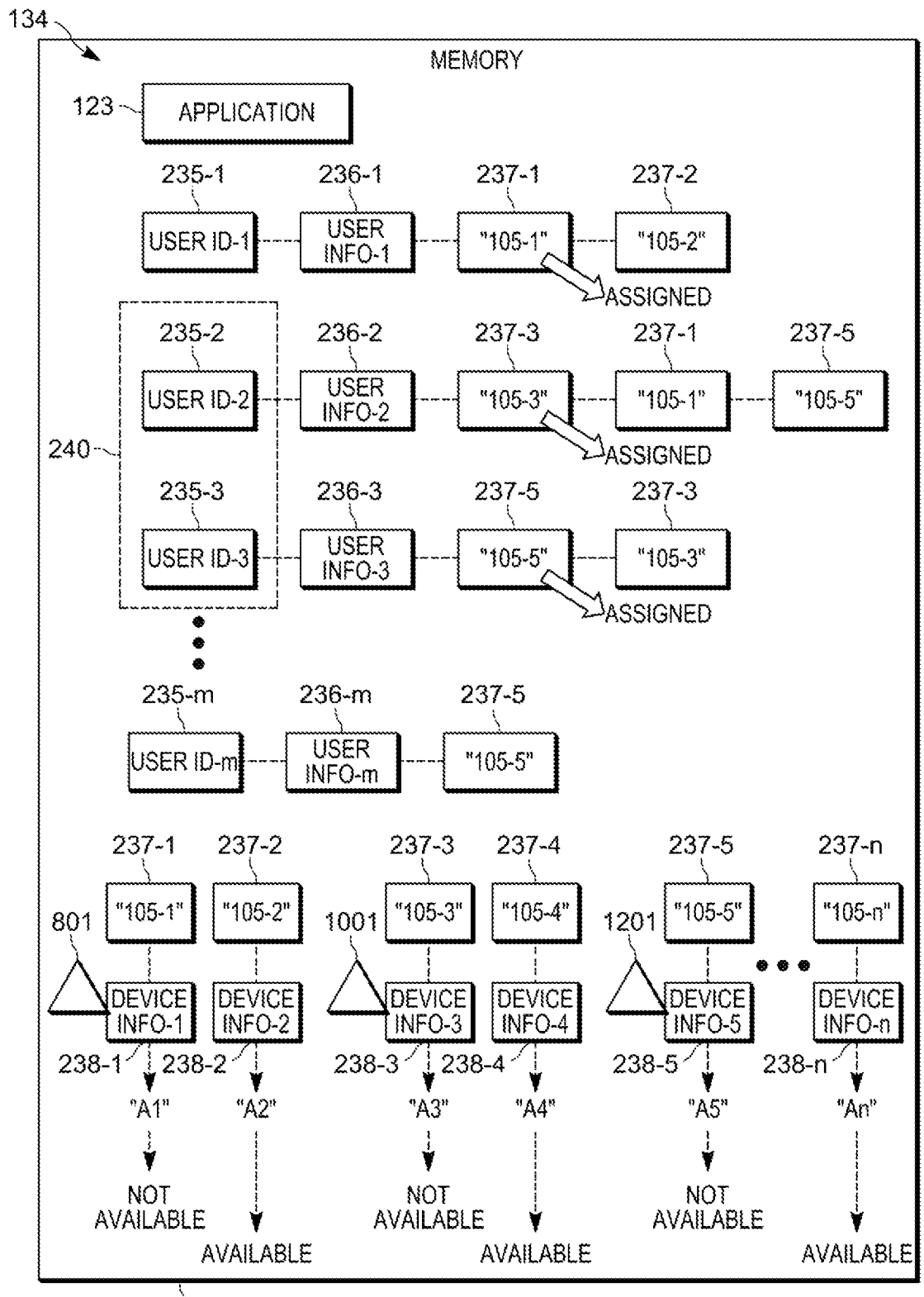
FIG. 13 depicts the memory of the server after a mobile device is assigned to the third user identifier in accordance with some embodiments.

Hence, with reference to FIG. 13, in the depicted example, the controller 120 assigns the available mobile device 105-4 storing the respective information 238-4 associated with the user identifier 235-$m$ by: determining that, of the plurality of shared mobile devices 105, the available mobile device 105-4 has a smallest difference 1401-2, 1401-4, 1401-$n$ between: the respective information 238-4 associated with the user identifier 236-$m$ stored at the available mobile device 105-4; and the information 236-$m$ associated with the user identifier 235-$m$ stored at the memory 122.

In other words, the controller 120 determines a respective difference 1401-2, 1401-4, 1401-$n$ between the user information 236-$m$ and the device information 238-2, 238-4, 238-$n$ stored at the available mobile devices 105-2, 105-4, 105-$n$. The relative size of the respective difference 1401-2, 1401-4, 1401-$n$ is visually indicated in FIG. 14, with the difference 1401-4 being the smallest.

The device 105-2, 105-4, 105-$n$ storing respective device information 238 that is closest to the user information 238-$m$ is assigned to the user identifier 235-$m$. In other words, as the difference 1401-4 is smaller than the differences 1401-2, 1401-$n$, the device 105-4 is assigned to the user identifier 235-$m$.

Further, the controller 120 controls the output device 103 to provide an indication of the assignment.

Further, the controller 120 transmits, to the device 105-4, the difference 1401-4 between: the respective information 238-4 associated with the user identifier 235-$m$ stored at the available mobile device 105-4 (e.g. as retrieved from the memory 122); and the user information 236-$m$ associated with the user identifier 235-$m$ stored at the memory 122. The controller 120 may also control an indicator device at the location "A4" to provide a notification 1407 of the assignment.

In the foregoing specification, various processes of assigning an available mobile device 105, of the plurality of shared mobile devices 105, to a user identifier 235 have been described including: assigning an available mobile device 105 based on most recently assigned device 105, devices 105 previously assigned to a group 240, and a smallest difference between stored user information 236 and stored device information 238. Furthermore, such processes were described as occurring in a particular order; however, the processes may be implemented in any order and/or some of the processes may be omitted and/or prioritized. For example, in some embodiments, the assigning may be based on the smallest difference between stored user information 236 and stored device information 238 only.

Furthermore, in the foregoing specification various processes for determining availability of the devices 105 were described. However, any process for determining availability of the devices 105 is within the scope of the present specification including, but not limited to: tracking current respective locations of the plurality of shared devices 105 (e.g. based on querying the devices 105, and assuming each device 105 includes a location determining device); tracking current user identifier associations of the plurality of shared devices 105 (e.g. as depicted at least in FIG. 13 with regards to the markings "Assigned"); querying the radio-frequency identification (RFID) scanner 113 tracking the plurality of shared devices 105 at a given location (e.g. the storage facility 106); and querying one or more battery chargers 107 at the given location.

In any event, described herein is a device and method for controlling load on server where: shared mobile devices are assigned to user identifiers based on information stored at the shared mobile devices that are associated with the user identifiers; and only a difference between stored user information and stored device information is transmitted to an assigned mobile device. Each may reduce the overall load on the server in provisioning assigned mobile devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the scanner to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A server comprising:
a communication interface; and
a controller configured to:
receive, using the communication interface, a user identifier;
assign an available mobile device, of a plurality of shared mobile devices, to the user identifier, the available mobile device storing respective information associated with the user identifier by
determining a subset of the plurality of shared mobile devices, which were one or more of: previously assigned to the user identifier, most recently assigned to the user identifier; and stores respective information associated with the user identifier; and selecting the available mobile device from the subset;
determining that, of the subset of shared mobile devices, the available mobile device has a smallest difference between: the respective information associated with the user identifier stored at the available mobile device; and information associated with the user identifier stored at a memory accessible to the controller; and
control, via the communication interface, an output device to provide an indication of an assignment of the available mobile device.

2. The server of claim 1, wherein the controller is further configured to determine the subset of the plurality of shared mobile devices by: determining a group of user identifiers that includes the user identifier; and selecting the subset of the plurality of shared mobile devices that are one or more of: associated with the user identifiers of the group, previously assigned to the user identifiers of the group, and most recently assigned to the user identifiers of the group.

3. The server of claim 1, wherein the controller is further configured to determine availability of the plurality of shared devices by one or more of: tracking current respective locations of the plurality of shared devices; tracking current user identifier associations of the plurality of shared devices; querying a radio frequency identification (RFID) scanner tracking the plurality of shared devices at a given location; and querying one or more battery chargers at the given location.

4. The server of claim 3, wherein the controller is further configured to assign the available mobile device based on the availability of the plurality of shared devices.

5. The server of claim 1, wherein the controller is in communication with a memory storing one or more of: a record of the respective information associated with the user identifier stored at the available mobile device; and device identifiers of the plurality of shared mobile devices, which were one or more of previously assigned, and most recently assigned, to the user identifier.

6. The server of claim 1, wherein the controller is further configured to, in response to assigning the available mobile device to the user identifier control, using the communication interface, an indicator device at a location of the available mobile device, to provide a notification.

7. The server of claim 1, wherein the indication provided by the output device includes a location of the available mobile device.

8. The server of claim 1, wherein the controller is further configured to:
transmit, using the communication interface, to the available mobile device, data representing a difference between: the respective information associated with the user identifier stored at the available mobile device; and information associated with the user identifier stored at a memory accessible to the controller.

9. A method comprising:

receiving, at a controller, using a communication interface, a user identifier;

assigning, at the controller, an available mobile device, of a plurality of shared mobile devices, to the user identifier, the available mobile device storing respective information associated with the user identifier by determining a subset of the plurality of shared mobile devices, which were one or more of: previously assigned to the user identifier, most recently assigned to the user identifier; and stores respective information associated with the user identifier; and selecting the available mobile device from the subset;

determining that, of the subset of shared mobile devices, the available mobile device has a smallest difference between: the respective information associated with the user identifier stored at the available mobile device; and information associated with the user identifier stored at a memory accessible to the controller; and controlling, via the communication interface, an output device to provide an indication of an assignment of the available mobile device.

10. The method of claim 9, further comprising: determine the subset of the plurality of shared mobile devices by: determining a group of user identifiers that includes the user identifier; and selecting the subset of the plurality of shared mobile devices that are one or more of associated with the user identifiers of the group, previously assigned to the user identifiers of the group, and most recently assigned to the user identifiers of the group.

11. The method of claim 9, further comprising: determining, at the controller, availability of the plurality of shared devices by one or more of: tracking current respective locations of the plurality of shared devices; tracking current user identifier associations of the plurality of shared devices; querying a radio frequency identification (RFID) scanner tracking the plurality of shared devices at a given location; and querying one or more battery chargers at the given location.

12. The method of claim 11, farther comprising: assigning, at the controller, the available mobile device based on the availability of the plurality of shared devices.

13. The method of claim 9, wherein a memory, accessible to the controller, stores one or more of: a record of the respective information associated with the user identifier stored at the available mobile device; and device identifiers of the plurality of shared mobile devices, which were one or more of previously assigned, and most recently assigned, to the user identifier.

14. The method of claim 9, farther comprising: in response to the controller assigning the available mobile device to the user identifier: controlling, at the controller, using the communication interface, an indicator device at a location of the available mobile device, to provide a notification.

15. The method of claim 9, wherein the indication provided by the output device includes a location of the available mobile device.

16. The method of claim 9, farther comprising:

transmit, from the controller, using the communication interface, to the available mobile device, data representing a difference between: the respective information associated with the user identifier stored at the available mobile device; and information associated with the user identifier stored at a memory accessible to the controller.

* * * * *